United States Patent [19]

Canon

[11] Patent Number: 5,099,181

[45] Date of Patent: Mar. 24, 1992

[54] PULSE-WIDTH MODULATION SPEED CONTROLLABLE DC BRUSHLESS COOLING FAN

[76] Inventor: K. N. Hsu Canon, No. 31-1, Shien Pam Rd., Kuei Shan Ind. Zone, Taoyuan, Taiwan

[21] Appl. No.: 695,469

[22] Filed: May 3, 1991

[51] Int. Cl.$^5$ .............................................. H02K 9/06
[52] U.S. Cl. ...................... 318/254; 310/62; 310/68 R; 417/45; 417/354
[58] Field of Search ............... 318/138, 254, 439, 599; 310/52, 53, 68 R, 68 C, 156, DIG. 3, DIG. 6, 62, 63, 71; 417/45, 354

[56] References Cited

U.S. PATENT DOCUMENTS

| | | | |
|---|---|---|---|
| 4,554,491 | 11/1985 | Plunkett | 318/254 |
| 4,656,553 | 4/1987 | Brown | 361/31 |
| 4,694,371 | 9/1987 | Reinhardt et al. | 361/23 |
| 4,773,828 | 9/1988 | Hagiwara et al. | 417/354 |
| 4,832,576 | 5/1989 | Deguchi et al. | 417/45 |
| 4,926,099 | 5/1990 | Ricker et al. | 318/254 |
| 5,028,216 | 7/1991 | Harmsen et al. | 417/354 |

Primary Examiner—Bentsu Ro

[57] ABSTRACT

A cooling fan for use inside a circuit system, especially a pulse-width modulation speed controllable DC cooling fan which can automatically vary its speed according to the internal temperature of the circuit system. An object of the invention is to control the rotation speed of the fan by a pulse-width modulation fan speed control circuit composed of a plurality of resistors, capacitors, diodes, Zener diodes, ICs and a thermistor, which is installed inside a circuit system in combination with a DC brushless fan. The control circuit in turn outputs control signal pulse following a monostable IC of said circuit continuously triggered by a phase changing cycle timing pulse signal transmitted of the fan motor. The pulse width of the control signal pulse is determined by a resistor element within a set of monostable pulse width timing resistor-capacitor (RC). The resistor element is a thermistor which is characterized in that it can vary the resistance depending on the temperature resulting in the variation of the output pulse width as the temperature changing to control the OFF time of the phase changing cycle of the fan motor for the purpose of controlling the rotation speed of the fan.

2 Claims, 3 Drawing Sheets

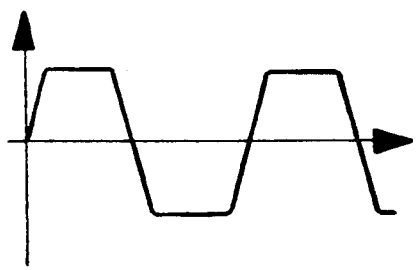
FIG. 3A
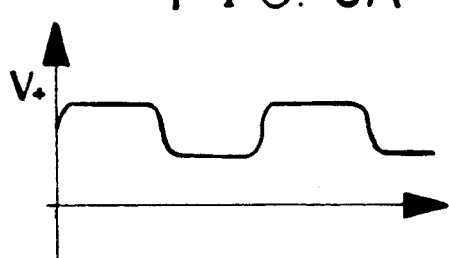
FIG. 3B
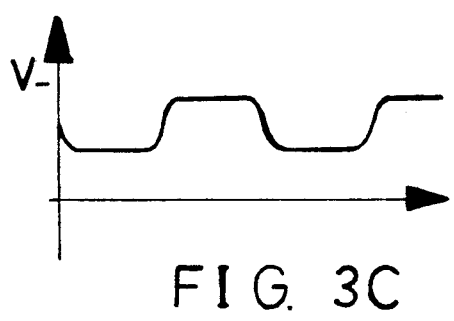
FIG. 3C
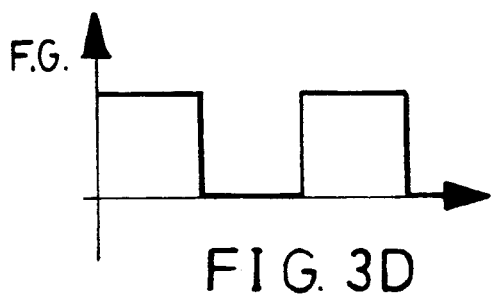
FIG. 3D
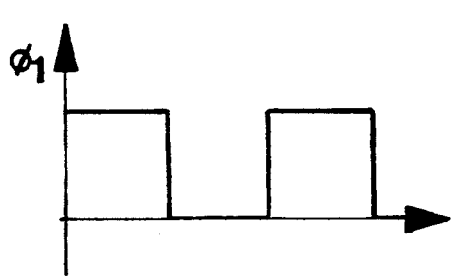
FIG. 3E
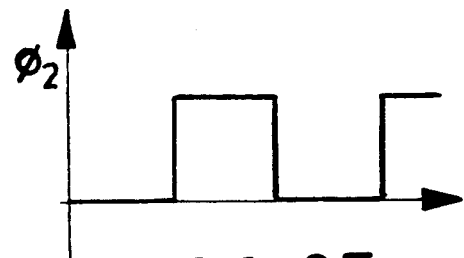
FIG. 3F
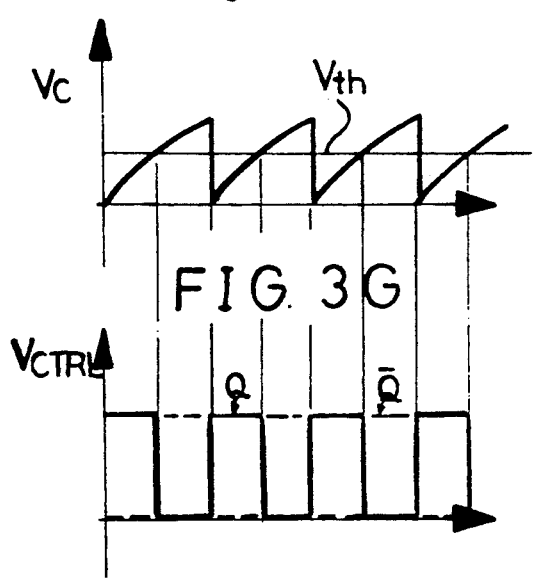
FIG. 3G
FIG. 3H
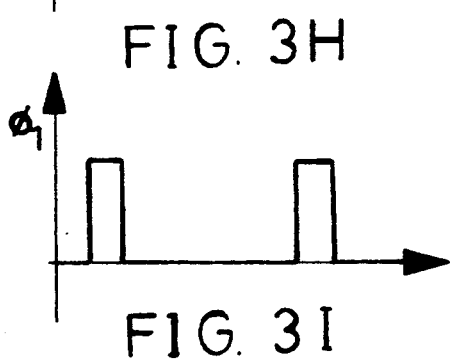
FIG. 3I
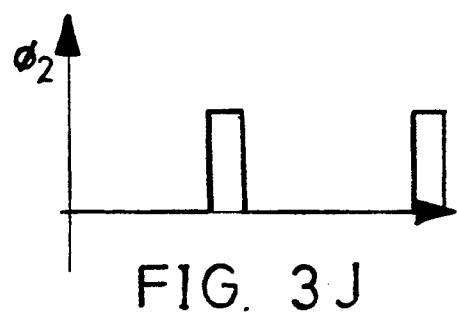
FIG. 3J 5,099,181

PULSE-WIDTH MODULATION SPEED CONTROLLABLE DC BRUSHLESS COOLING FAN

BACKGROUND OF THE INVENTION

1. Field of the Invention

The present invention relates to a cooling fan for use inside a circuit system, in particular, a pulse-width modulation speed controllable DC cooling fan which can automatically vary its speed according to the internal temperature of the circuit system. While the internal temperature of the circuit system rising, the thermistor in the pulse width modulation fan speed control circuit will decrease the resistance and increase the current to increase the rotation speed of the fan such that the internal air inside the circuit system is forced to flow fast and carries away the heat emitted inside the circuit system resulting in a normal function of the system being kept. On the other hand, while the temperature is falling, said speed control circuit will cut down the power supply by increasing the resistance of the thermistor to reduce the rotation speed of the fan and the undesirable noise. Additionally, the control IC is a low power consumption complement metal-oxide-semiconductor (CMOS) so that it is extremely energy saving.

2. Description of the prior art

Circuit systems have wide range of application in various mechanical devices and control apparatus and bring a various convenient modern life for human beings. However, a circuit system must exert functions through the conductance of a current, so that unavoidably, heat will produced by the energy flow. If the heat can not be deprived the circuit system will be made to operation abnormally or be damaged. The most common type of conventional speed controllable cooling fan is an usual fan driven by a speed control circuit of voltage drop type which is provided with an expensive high power thermistor positioned between the fan motor and the power supply for the purpose of controlling the rotation speed of the fan motor by the variation of the voltage and current of the input power by means of altering the resistance of the thermistor as the temperature changes. But once the power consumption of the fan motor is too high or the voltage of the power supply is too low, the high power thermistor will not function normally and on the contrary, it will emit much heat to even increase the internal temperature of the circuit system.

Still further, a voltage regulator type speed control circuit has also been used which has a voltage regulator and a conventional thermistor inserted in between the power source and the fan motor and additionally has a power supply circuit provided at the beginning for designing the circuit system thereof. In addition to occupying more space of the circuit system, upon consideration of low voltage driving of the fan motor, a low voltage operatable driving IC must be chosen for the above two fan motors. Better design for the motor even bothers the choice of fan housing material and the manufacturing process. Besides, the speed control circuit results in heat producing problems of the circuit system.

SUMMARY OF THE INVENTION

The main object of the present invention is directed to provide a cooling fan of a circuit system which occupies the same size of space as that of the conventional fixed speed fan and does not have additional power supply circuit. Besides, the cooling fan of the invention can directly receive the rated input voltage from the circuit system and it is not necessary to possess the feature of low voltage operation of the fan being controlled. This type of a fan can dispense with the problem brought by low starting voltage and input power of the fan motor, therefore it will cut down the cost of production and simplify the manufacturing process.

Another object of the invention is directed to a cooling fan wherein the elements of control circuit are not sophisticated and can be installed in the existed fans. Additionally, the elements of the control circuit employed consume minute power and produce little heat so that at a given temperature, it is easy to replace the resistor or capacitor only to achieve the regulation for the speed.

A further object of the invention is to obtain a high voltage, low speed DC brushless fan by means of the cooling fan according to the invention which can dispense the bothering of problems, e.g. space and difficult process caused by reducing the diameter of wire and increasing the number of winding coils in order to withstand the high voltage.

A still further object of the invention is aiming to reform the production process of a fan by means of utilizing electronic elements for the purpose of obtaining a desired speed without altering the number of winding coils and diameter of wire as that performed onto the current existent fans.

Still another object of the invention is to achieve energy saving and noise reducing by means of a circuit system of the cooling fan according to the invention which has an appropriate rotation speed of fan corresponding to the temperature and also facilitates the same circuit system function normally.

A more complete understanding of these and other features and advantages of the present invention will become apparent from a careful consideration of the following detailed description of certain embodiments illustrated in the accompanying drawings.

BRIEF DESCRIPTION OF THE DRAWINGS

FIG. 3A is a waveform of the magnetic field changing between a motor and a magnet induced by IC2 in the circuit of the invention.

FIG. 3B is a waveform of the positive output voltage by IC2 in the circuit of the invention.

FIG. 3C is a waveform of the negative output voltage by IC2 in the circuit of the invention.

FIG. 3D is a waveform with a same phase obtained by IC1 shaping the positive and negative input electric wave by IC2 in the circuit of the invention.

FIG. 3E is an output waveform by the semiconductor switch $\phi1$ controlled with a same phase electric wave by IC1 in the circuit of the invention.

FIG. 3F is an output waveform by the semiconductor switch $\phi2$ controlled with an electric wave of the same phase by IC1 in the circuit of the invention.

FIG. 3G is a waveform of the capacitor voltage (Vc) for charging and discharging at the capacitor C2 in the circuit of the invention.

FIG. 3H is a waveform of the control output voltage ($V_{CTRL}$) by IC3 during charging and discharging at the corresponding capacitor C2 in the circuit of the invention.

FIG. 3I is a pulse width modulation waveform of the electric wave shown in FIG. 3E following shaping by the feedback signal in the circuit of the invention.

FIG. 3J is a pulse width modulation waveform of the electric wave shown in FIG. 3F following shaping by the feedback signal in the circuit of the invention.

DESCRIPTION OF THE PREFERRED EMBODIMENTS

Figure 1:
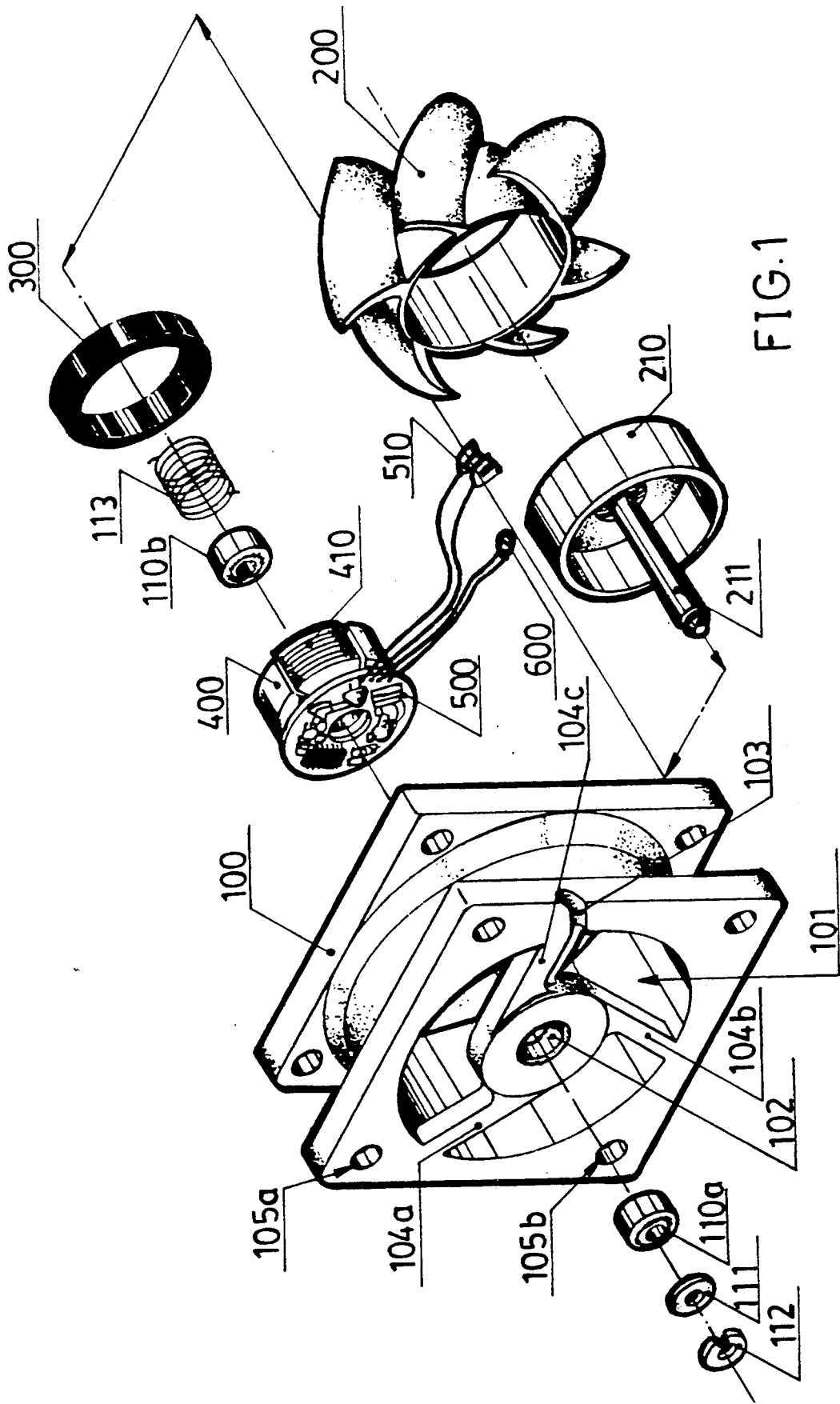
FIG. 1 is an exploded perspective view of the cooling fan of the invention.

FIG. 1 is an exploded perspective view of the cooling fan according to the present invention. From the Figure, it can be seen that the cooling fan claimed in the present invention comprises a fan housing 100 wherein a fan blade compartment 101 is provided to contain the fan blades 200, three container supports 104a, 104b, 104c are provided o the front side to support the central container 102 for the rotating shaft of the fan, and inside the container 102, two ball bearings 110a, 110b can be inserted and a circuit board 500 is inserted into the outer border and also welded on the circuit board 500 a brushless motor body 400. A power line 510 and a thermistor 600 come out via an outlet groove 103 of the container support 104c.

A magnetic circuit joint cap 210 covers the fan blades 200 from outside and an annular permanent magnet 300 inserts into the inner border thereof and then the rotating shaft 211 of the fan blade inserted in the magnetic circuit joint cap 210 penetrates sequentially through a buffer spring 113, a ball bearing 110b inside of the container 102 for the rotating shaft of the fan, a brushless motor body 400, a circuit board 500 and finally, through a ball bearing 110a, comes out of the container 102 for the rotating shaft of the fan. The out portion of the shaft is covered with a washer 111 and buckled with a retaining ring 112 to form a cooling fan in combination.

Figure 2:
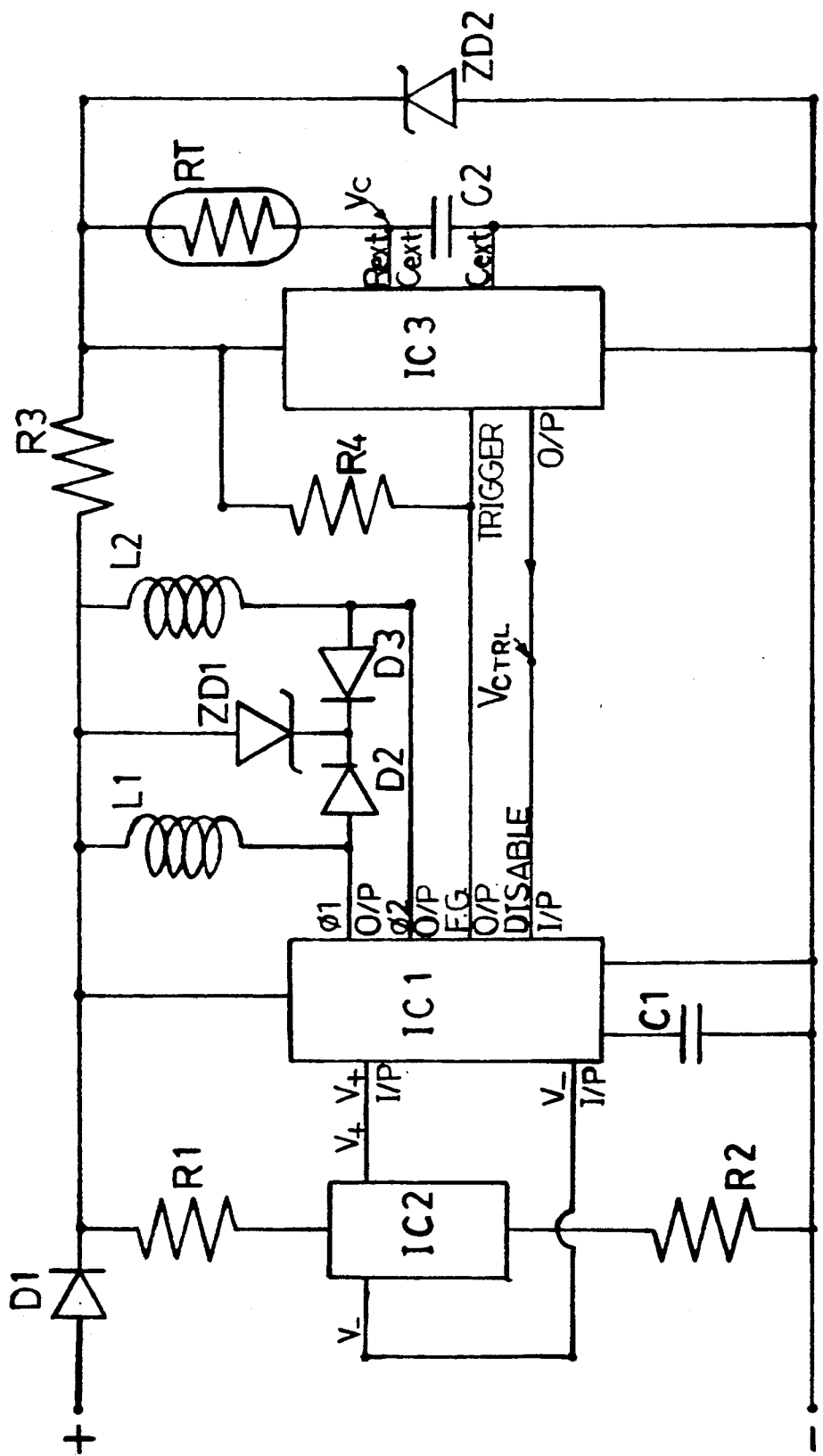
FIG. 2 is a circuit diagram of the cooling fan of the invention.

FIG. 2 is a speed control circuit for the pulse width modulation fan of the invention. When the power connects via inverse voltage protection diode D1 to the circuit and the brushless motor 400 of the fan, the fan blades 200 start to rotate the interaction between a winding coil 410 and an annular permanent magnet 300. At this time, a Hall effect induction IC IC2 at the phase changing starting point of the DC motor can receive the electric wave induced from the alteration of the magnetic field between the winding coil 410 of the fan and the annular permanent magnet 300 (as shown in FIG. 3A) via a predetermined current and DC level supplied by resistors R1, R2. Subsequently, positive (V+) and negative (V−) voltage (its waveforms as shown in FIGS. 3B and 3C) output from the Hall effect induction IC IC2 into a driving IC IC1 which has the above mentioned two waveforms be shapened by comparing with the internal voltage to get the same F.G. waveform as shown in FIG. 3D and then, with the same phase electric wave, controls the output electric wave output by semiconductor switches $\phi 1$, $\phi 2$ as shown in FIGS. 3E, 3F. The motor windings L1, L2 (i.e. the winding coil 410) are controlled by the electric wave output by semiconductor switches $\phi 1$, $\phi 2$ to have phase changing action according to the magnetic dipole (i.e. annular permanent magnet 300). The pulse voltage resulted from the phase changing action is absorbed by diodes D2, D3 and a power stabilizing Zener diode ZD1. Further, a timer capacitor C1 provides the driving IC IC1 per se the re-starting power from a totally moveless state while the fan stops thereby the driving system composed of IC1 and IC2 can drive the fan and deliver a feedback, cycle timing pulse signal.

Besides, a rising and falling edge trigger monostable IC IC3 is situated on the right side of the circuit according to the invention and is connected via a resistor of limiting current R3 and a power stabilizing Zener diode ZD2. Upon a wave with a same phase is output by a frequency generator (F.G.) of a driving IC IC1, because it is output by a open collector, it may produce a Hi-Lo level consistent with that of the rising and falling edge trigger monostable IC IC3 by a resistor R4 and therefore, it emits a signal having the waveform of FIG. 3D. When the triggering pulse signal enters via a monostable pulse width timing circuit consisted of the thermistor (R.T.) and the capacitor C2 of the rising-falling edge (relating to each start point of the phase changing cycle) of IC3, the stored charge in the capacitor C2 will discharge and re-charge and the output Q ($\bar{Q}$) will be phase changing from Lo (Hi) to Hi (Lo). When the capacitor C2 is charging to reach that the capacitor voltage (Vc) equals to the threshold voltage (Vth), after Q ($\bar{Q}$) is reset to Lo (Hi), the capacitor C2 continues charging till saturation or till next discharging and the waveforms are shown as in FIGS. 3G and 3H. If the control voltage ($V_{CTRL}$) signal as shown in FIG. 3H feedbacks to the disable input terminal of the driving IC IC1 (Hi disable →Q, Lo disable →$\bar{Q}$ ), the waveforms (as shown in FIGS. 3E and 3F) formed by the semiconductors $\phi 1$, $\phi 2$ driven by the motor of the fan can be controlled and changed into the waveforms shown in FIGS. 3I and 3J. These two waveforms are subjected to the control by the thermistor (RT) and IC3 to achieve the object of automatically regulating the rotation speed of the fan depending on the alteration of the temperature.

The following describe the fan subjecting to some special requirements:

1) While regulating the speed characteristics at the same temperature, only any one element of the monostable pulse width timing capacitor-resistor (RC) should be replaced.

2) While the speed of the fan is set at any one of high, medium or low speed, the thermistor in the monostable pulse width timing capacitor-resistor (RC) can be replaced by a fixed resistor.

3) The circuit with high voltage-low rotation speed has the same circumstances as described in item 1.

In view of the above, the cooling fan of the invention can accommodate various feature requirements by only replacing electronic parts during the manufacturing process, but the conventional ones should accommodate by increasing the winding coil and reducing the diameter of the wire. It can be understood that the labor and time saved during the manufacturing process relates to inserting electronic elements with low technology but not winding work with high technology. In summary, the invention has the advantages, e.g. energy saving, reducing idle time in the process, wide range of applications and the like.

I claim:

1. A pulse-width modulation, speed controllable D brushless cooling fan for use inside a circuit system which is characterized in that said cooling fan is provided with a pulse-width modulation fan speed controlling circuit which comprises a driving IC, a Hall effect inductive IC connected with the two terminals on the input side of the driving IC and a rising-falling edge trigger monostable IC connected with the two terminals on the output side of the driving IC; wherein the rising-falling edge trigger monostable IC further has a monostable pulse width timing resistor and a monostable pulse width timing capacitor on the output side thereof.

2. A pulse-width modulation, speed controllable DC brushless cooling fan as claimed in claim 1 whcih is characterized in that the rising-falling edge trigger monostable IC is further connected with two resistors.

* * * * *